(12) United States Patent
Baba et al.

(10) Patent No.: US 6,614,467 B1
(45) Date of Patent: Sep. 2, 2003

(54) IMAGE PROCESSING METHOD AND APPARATUS

(75) Inventors: Shigeyuki Baba, Tokyo (JP); Akira Shirakura, Tokyo (JP); Nobuhiro Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/386,195

(22) Filed: Aug. 30, 1999

(30) Foreign Application Priority Data

Aug. 31, 1998 (JP) .......................... P10-246408

(51) Int. Cl.[7] .......................... H04N 13/00; G03H 1/26; G06G 7/48
(52) U.S. Cl. .................. 348/43; 359/23; 703/5
(58) Field of Search .............. 348/43, 42, 46, 348/47, 48, 49, 51, 54, 44; 359/23, 22, 24, 25, 26, 30, 466; 382/154, 106; 703/1, 5

(56) References Cited

U.S. PATENT DOCUMENTS

| | | | | |
|---|---|---|---|---|
| 4,573,191 A | * | 2/1986 | Kidode et al. .............. 382/106 |
| 5,697,006 A | * | 12/1997 | Taguchi et al. ................ 348/48 |
| 5,796,991 A | * | 8/1998 | Shimizu ........................ 703/1 |
| 6,023,356 A | * | 2/2000 | Kihara et al. ................. 359/23 |
| 6,108,440 A | * | 8/2000 | Baba et al. ................... 359/23 |
| 6,123,733 A | * | 9/2000 | Dalton .......................... 703/5 |
| 6,236,475 B1 | * | 5/2001 | Kihara et al. ................. 359/23 |
| 6,392,689 B1 | * | 5/2002 | Dolgoff ....................... 348/44 |

* cited by examiner

Primary Examiner—Gims S. Philippe (57) ABSTRACT

In generating a parallax image string used for generating a holographic stereogram, the image quality of a stereoscopic image generated from the parallax image string is to be maintained as the time needed in imaging the parallax image string is shortened. To this end, an optimum number of image frames of each of plural parallax image strings are photographed in agreement with the localized position of the reproduced image of a generated holographic stereogram. The image processing is executed for equating the numbers of frame images of the parallax image strings. The parallax image strings having the equal number of the frame images of the parallax image strings are synthesized by, for example, chroma key synthesis to generate a new parallax image string.

10 Claims, 6 Drawing Sheets

IMAGE PROCESSING METHOD AND APPARATUS

BACKGROUND OF THE INVENTION

1. Field of the Invention

This invention relates to a method and apparatus for generating a parallax image string used for preparing a holographic stereogram.

2. Description of the Related Art

A parallax image string, made up of plural images having the parallax information, is used in preparing, for example, a holographic stereogram configured for displaying a stereographic image thereon. The holographic stereogram is prepared by sequentially imaging an object from different viewing points to produce a parallax image string made up of a large number of images and by sequentially recording the parallax image string as an original image on a sole recording medium for holograms as strip- or dot-shaped elementary holograms.

Figure 1:
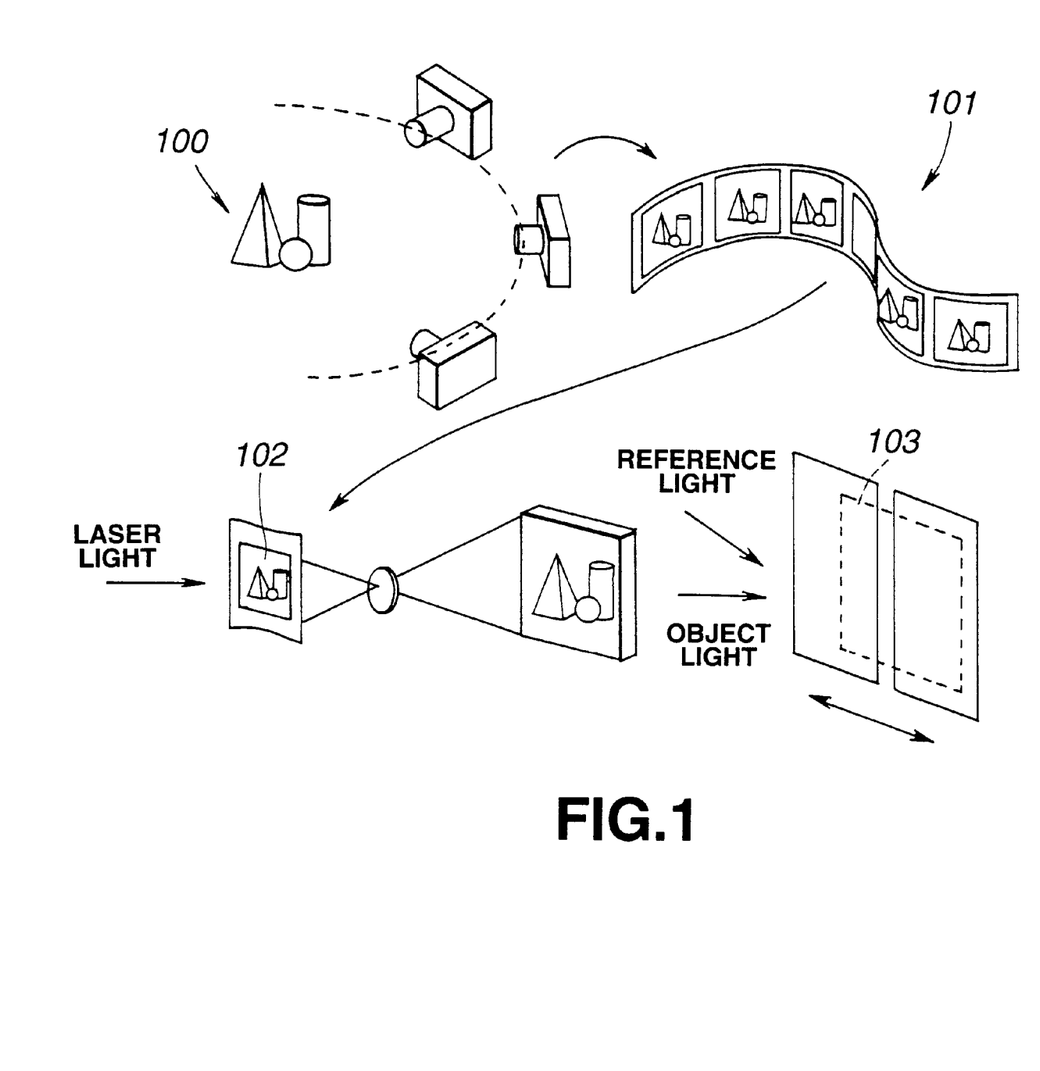
FIG. 1 schematically shows an illustrative structure of a parallax image string in accordance with the re-centering system.

For example, referring to FIG. 1, in generating a holographic stereogram having the parallax information only in the transverse direction, an object 100 is sequentially imaged from different viewing points in the transverse direction to produce a parallax image string 101 made up of plural images having the parallax information only in the transverse direction. The images 102 making up the parallax image string 101 are sequentially recorded as strip-shaped elementary holograms on a recording medium for hologram 103 so that these images 102 will be consecutive to one another in the transverse direction. This produces a holographic stereogram carrying the parallax information in the transverse direction.

If this holographic stereogram is viewed from a certain position with one eye, a two-dimensional image, as an assembly of the image information of portions of the respective elementary holograms, is seen. If the eye position is moved horizontally, another two-dimensional image, as an assembly of the image information of different portions of the respective elementary holograms, is seen. Therefore, if this holographic stereogram is seen by a viewer with both eyes, the two-dimensional images, seen with left and right eyes, differ slightly from each other because of the difference in the positions of the left and right eyes. This causes the viewer to perceive the parallax so that a three-dimensional image is reproduced in the horizontal direction. This sort of the holographic stereogram is described in, for example, the Japanese Laying-Open Patent H-10-20756.

When photographing a parallax image string as an original image for the holographic stereogram, an object is imaged from different directions as an image pick-up device is moved. This generates a parallax image string made up of plural images having the parallax information. Specifically, a video camera, designed to perform image pickup at a rate of 30 frames per second, is used as an image pick-up device, and the object is imaged in succession as the video camera is moved at a preset speed. If the image is photographed for e.g., 7.5 second, 225 frames can be photographed, as a result of which a parallax image string made up of 225 images having different viewing points with respect to the object is produced.

Since a parallax image string is obtained on sequentially imaging an object, certain time is taken in imaging the parallax image string. If the object is stationary, there is raised no problem even if longer time is needed in photographing the parallax image string. However, if the object is not stationary, for example, if the object is a human being, it is desirable that the time taken in photographing the parallax image string be as short as possible, because the object is likely to move during imaging.

However, if, when the number of the frames that can be photographed in unit time is set, the time taken in imaging the parallax image string is shortened, and the number of images that make up the parallax image string is decreased. In this case, the stereoscopic image produced from the parallax image string is deteriorated in image quality.

That is, there is a relation of trade-off between the time taken in photographing the parallax image string and the quality of the stereoscopic image produced from the parallax image string, such that it has so far been difficult to maintain the sufficient image quality of the stereoscopic image derived from the parallax image string while the time taken in photographing the parallax image string is reduced.

SUMMARY OF THE INVENTION

It is therefore an object of the present invention to provide an image processing method and apparatus whereby it is possible to reduce the time needed in photographing a parallax image string and yet to render it possible to maintain the sufficient image quality of the stereoscopic image derived from the parallax image string.

In one aspect, the present invention provides an image processing apparatus for generating a parallax image string composed of a plurality of images carrying the parallax information, including image frame number adjustment means for equating the numbers of image frames making up each of a plurality of parallax image strings to one another, and image synthesis means for synthesizing the parallax image strings, the numbers of the image frames of which have been equated to one another by the image frame number adjustment means, to generate a new parallax image string.

In another aspect, the present invention provides an image processing method for generating a parallax image string composed of a plurality of images carrying the parallax information, including equating the numbers of image frames making up each of a plurality of parallax image strings to one another, and synthesizing the parallax image strings, the numbers of the image frames of which have been equated to one another, to generate a new parallax image string.

In general, in reproducing a stereoscopic image from a parallax image string, the number of original image frames necessary to maintain the image quality of the reproduced image differs with the fixing position of the reproduced image. For example, if the respective images making up a parallax image string are sequentially recorded as elementary holograms on the recording medium for holograms to produce a holographic stereogram, the number of original frames necessary to keep the same image quality differs depending on whether the reproduced image is to be localized on a place recessed from the surface of the recording medium for hologram, on the surface of the recording medium for hologram or on a place lying ahead of the surface of the recording medium for hologram. The reason is that the correlation of the images at respective viewing points differs with the localized positions of the reproduced image.

Therefore, if the object is imaged as the number of the image frames of the parallax image string is changed with different localized positions of the reproduced image, it is possible to photograph optimum numbers of image frames of the parallax image string in meeting with the localized positions of the reproduced image. Stated differently, photographing of a number in excess of the required number of the image frames is not needed to render it possible to diminish the time necessary for imaging a parallax image string. However, the plural parallax image strings, thus produced, cannot be directly used for regenerating a stereoscopic image.

Thus, according to the present invention, the numbers of the image frames making up each of plural parallax image strings are equated and the resulting parallax image strings are synthesized to generate a new parallax image string. This renders it possible to generate a parallax image string, from which to generate a stereoscopic image, from plural different parallax image strings.

Thus, according to the present invention, the numbers of the image frames making up each of plural parallax image strings are equated and the resulting parallax image strings having the equal number of image frames are synthesized to generate a new parallax image string. This renders it possible to generate a parallax image string, from which to generate a stereoscopic image, from plural different parallax image strings.

Specifically, according to the present invention, an object can be imaged as the number of image frames of the parallax image strings are changed, whereby it is possible to photograph an optimum number of image frames of the parallax image strings in meeting with the objects. That is, according to the present invention, it is unnecessary to photograph the objects more than a required number of times to render it possible to diminish the time in photographing the parallax image strings. Stated differently, it is possible to maintain the image quality of the stereoscopic image obtained from the parallax image strings as the time needed in photographing the parallax image string is reduced.

BRIEF DESCRIPTION OF THE DRAWINGS

FIG. 8 consisting of FIGS. 8A and 8B shows an illustrative structure of an optical system of a holographic stereogram printer.

DESCRIPTION OF THE PREFERRED EMBODIMENTS

Referring to the drawings, preferred embodiments of the present invention will be explained in detail. Although the present invention is applied to a holographic stereogram generating system, by way of an example, the image processing method and apparatus according to the present invention can be extensively applied to any technical field in need of a parallax image string. For example, the parallax image string is required when displaying a stereo image on a display device by taking advantage of the parallax. The image processing method and apparatus according to the present invention can be applied to such case.

Figure 2:
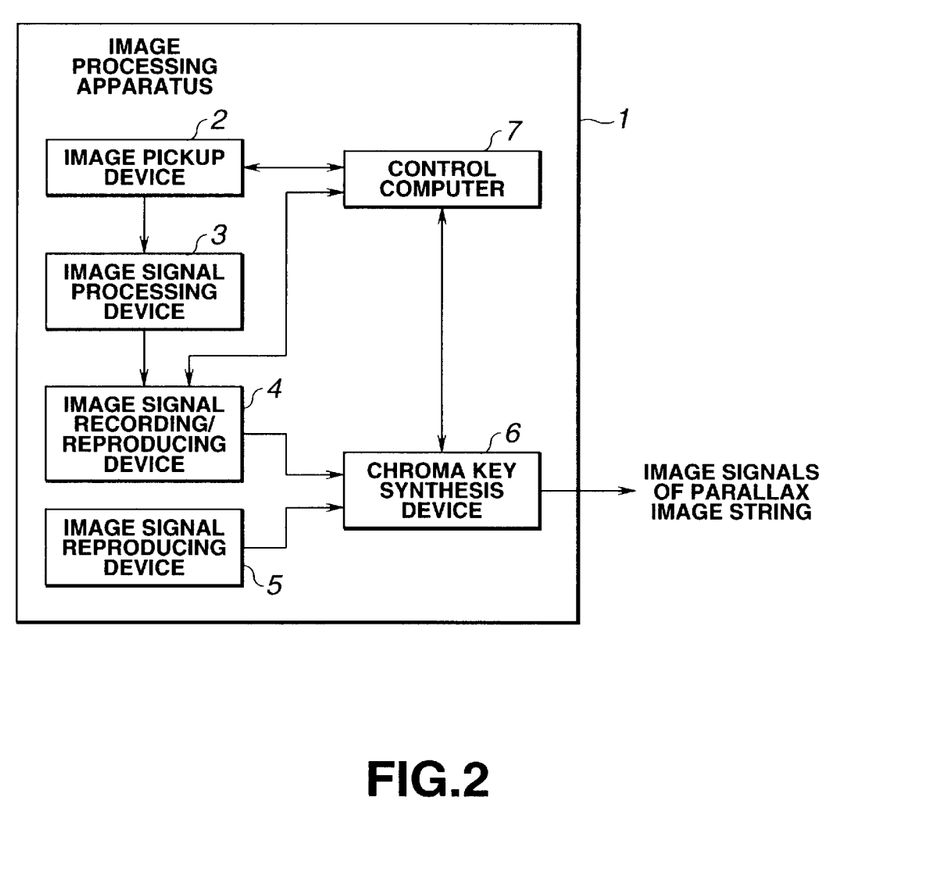
FIG. 2 is a block diagram showing an illustrative structure of an image processing device embodying the present invention.

FIG. 2 shows an illustrative structure of an image processing device embodying the present invention. This image processing device 1 images an object, such as a human, to generate a parallax image string, which then is synthesized to a pre-imaged background parallax image string to generate a new parallax image string. Referring to FIG. 2, the image processing device 1 includes an image pickup device 2, an image signal processing device 3, an image signal recording/reproducing device 4, an image signal reproducing device 5, a chroma key synthesis device 6 and a control computer 7 supervising the operation of the respective devices.

The image pickup device 2, imaging an object, such as a human, is comprised of, for example, a CCD camera. When photographing a parallax image string, the object is imaged from different directions as the image pickup device 2 is moved. The image signals of the parallax image string, photographed by the image pickup device 2, are routed to the image signal processing device 3.

The image signal processing device 3 operates for converting the image signals of the parallax image string produced on imaging the object by the image pickup device 2 into signals of a pre-set form, and is comprised of, for example, a D1 decoder. The image signals from the image pickup device 2 are converted into signals of a pre-set form and sent in this form to the image signal recording/reproducing device 4.

The image signal recording/reproducing device 4 is adapted for recording image signals on a recording medium or reproducing the image signals recorded on the recording medium. The recording medium may, for example, be an optical disc, a magnetic tape or a semiconductor memory. The image signal recording/reproducing device 4 receives the image signals, converted into signals of the pre-set form by the image signal processing device 3, to record the image signals on the recording medium. Under a command from a control computer 7, the image signal recording/reproducing device 4 reads out and reproduces the image signals recorded on the recording medium. The image signals reproduced by the image signal recording/reproducing device 4 are routed as, for example, NTSC signals, to the chroma key synthesis device 6.

When reproducing image signals from the recording medium, the image signal recording/reproducing device 4 repeatedly outputs image signals of the same frame under a command by the control computer 7. Stated differently, the image signal recording/reproducing device 4 sets the number of the frames of the output image signals so as to be larger than the number of frames of the image signals reproduced from the recording medium.

It is assumed that the image pickup device 2 photographs 30 frames per second and that the object is imaged for three seconds in succession as the image pickup device 2 is moved at a pre-set speed. At this time, 90 frames of the image signals are recorded on the recording medium. If, for example, 225 frames are desired in reproducing the image signals, the image signal recording/reproducing device 4 repeatedly outputs each frame twice or thrice to output 225 frames of the image signals on the whole.

The image signal reproducing device 5 is configured for reproducing image signals from the recording mediums, such as an optical disc, a magnetic disc, a magnetic tape or a semiconductor memory, and reads out and reproduces the image signals recorded on the recording medium, under a command by the control computer 7, whenever the necessity arises. The image signals, reproduced by the image signal reproducing device 5, are sent as, for example, NTSC signals, to the chroma key synthesis device 6.

The chroma key synthesis device 6 executes chroma key synthesis of the image signals sent from the image signal recording/reproducing device 4 and the image signals sent from the image signal reproducing device 5, under control by the control computer 7, to generate image signals of a new parallax image string. The image signals of the parallax image string, newly produced by the chroma key synthesis by the chroma key synthesis device 6, are outputted to outside.

The generation of the parallax image string by the image processing device 1, as described above, is hereinafter explained by taking a specified example.

It is assumed that image signals of a parallax image string, from which is derived a holographic stereogram, in which a reproduced image of a human is localized on a recording medium for hologram and the reproduced image as a background is localized at a more recessed position than the plane of the recording medium for hologram, is to be produced. It is also assumed that the background parallax image string is pre-photographed, with the image signals being 225 frame image signals, continuing for 7.5 seconds, with the video rate of 30 frames per second.

The parallax image string is obtained on imaging an object from different viewing points. In the case of an object localized on the recording medium for hologram, the images between the respective viewing points exhibit high correlation, such that, if the viewing point positions are changed, the image is scarcely changed. On the other hand, in the case of an object localized in a more recessed position than the surface of the recording medium for hologram, the correlation of the images between the viewing points is low, such that, if the viewing points are changed, the image is changed significantly.

Therefore, the number of frames of the parallax image string, obtained on imaging an object localized on the recording medium for hologram, may be smaller than that of the parallax image string obtained on imaging an object localized at a position more recessed from the recording medium for hologram. Stated differently, even if the number of frames of the parallax image string of the object is decreased, the reproduced image localized on the recording medium for hologram can be of the same level in quality as that localized at a more recessed place than the plane of the recording medium for hologram.

Therefore, it is assumed that, in the present example, an object a reproduced image of which is localized on the recording medium for hologram, that is a human, is imaged for three seconds at a video rate of 30 frames per second, to produce 90 frames.

Figure 3:
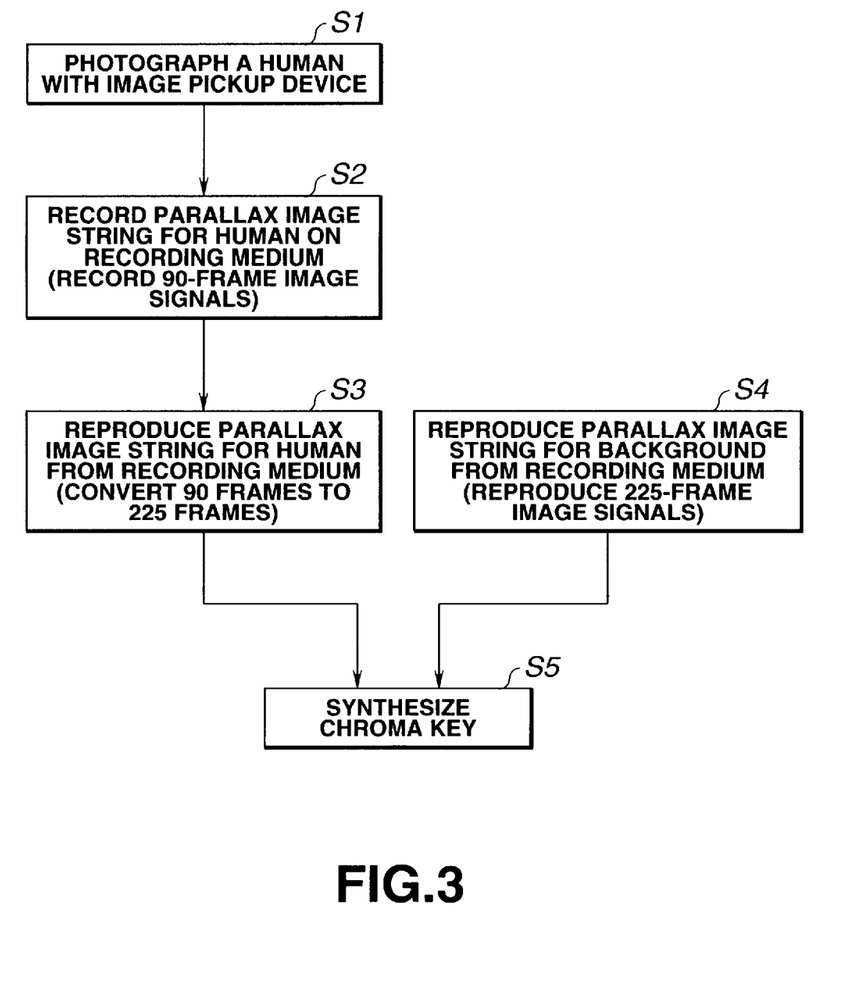
FIG. 3 shows a processing flow in preparing a new parallax image string by the image processing device shown in FIG. 2.

That is, an object, a reproduced image of which is localized on the recording medium for hologram, that is a human, is imaged for three seconds at a video rate of 30 frames per second, to produce 90 frames, as indicated at step S1 in FIG. 3. This imaging is executed under the background of, for example, a blue color, in order to permit chroma key synthesis subsequently. Also, for this imaging, the image pickup device 2 is moved at a pre-set speed so that the viewing point positions for imaging will differ from one frame to another. The image signals of the parallax image string are converted by the image signal processing device 3 into signals of a pre-set form before being recorded on the recording medium by the image signal recording/reproducing device 4, as indicated at step S2.

The image signals, thus recorded on the recording medium, are then reproduced by the image signal recording/reproducing device 4, as shown at step S3. At this time, the image signal recording/reproducing device 4 reproduces the image signals so that the number of frames of the parallax image string for a human will be equal to that of the parallax image string for the background. Stated differently, the image signal recording/reproducing device 4 reproduces the image signals so that the number of frames of images making up the parallax image string for a human will coincide with that of images making up the parallax image string for the background.

In the preferred embodiment, the time for photographing the background is 7.5 seconds, with the total number of the frames being 225 frames. Thus, when reproducing the image signals of the parallax image string for a human from the recording medium, the image signal recording/reproducing device 4 repeatedly outputs the frames twice or thrice on end, to output a sum total of 225 frames of the image signals. The image signals of the parallax image string, which have photographed the background, are reproduced by the image signal reproducing device 5, as indicated at step S4.

The image signals reproduced by the image signal recording/reproducing device 4, that is image signals of a parallax image string for a human, and the image signals reproduced by the image signal reproducing device 5, that is the image signals of the parallax image string for the background, are inputted to the chroma key synthesis device 6. The image signal recording/reproducing device 4 operates so that the number of frames of the image signals of the parallax image string for the human will be equal to the number of frames of the image signals of the parallax image string for the background. Thus, the image signals from the image signal recording/reproducing device 4 and those from the image signal reproducing device 5 are inputted to the chroma key synthesis device 6 at the same video rate and at the same number of frames.

On reception of the image signals from the image signal recording/reproducing device 4 and those from the image signal reproducing device 5, the chroma key synthesis device 6 executes chroma key synthesis of the image signals, as indicated at step S5.

The number of frames of the image signals, reproduced by the image signal recording/reproducing device 4, that is the number of frames of the parallax image string for the human, is then equal to that of the image signals, reproduced by the image signal reproducing device 5, that is the number of frames of the parallax image string for the background. The chroma key synthesis device 6 performs chroma key synthesis of the image signals in the input order of the image frames. Thus, the image frames making up the parallax image string for the human is synthesized with the image frames making up the parallax image string for the background by chroma key synthesis, as a result of which a new parallax image string carrying both the human and the background is generated.

The image signals of the newly generated parallax image string are outputted from the chroma key synthesis device 6. The image signals of the newly generated parallax image string are routed to, for example, a holographic stereogram generating system for use for generating a holographic stereogram.

With the use of the image processing device 1, embodying the present invention, it suffices if an optimum number of frames of the parallax image string is prepared for each imaged object depending on the localized positions of the reproduced images. Specifically, the background and the human are imaged in the above example for 7.5 and 3 seconds, respectively. Thus, with the image processing device 1 embodying the present invention, it is possible to omit the imaging in more than a necessary amount to reduce the time involved in imaging the parallax image string.

The image processing device 1 embodying the present invention is particularly effective when reproduced images for the background and the human are localized in back of and on the plane of the recording medium for the hologram, respectively, as in the preferred embodiment. The reason is that, in many cases, the object which is to be the background is stationary and raises no problem if the time involved in photographing is protracted slightly, however, the human is likely to be moved during imaging and hence the time involved in photographing the parallax image string is desirably as short as possible. Thus, with the use of the image processing device 1 of the present invention, the reproduced image for the background, localized at back of the plane of the recording medium for hologram, may be of the equivalent image quality to that for the human, localized on the plane of the recording medium for hologram, even if the number of frames of the parallax image string for the human is reduced, thus significantly reducing the time consumed in imaging the human.

In reproducing image signals of the parallax image string by the image processing device 1, the image signal recording/reproducing device 4 repeatedly outputs the respective frames to output image signals of a number of frames larger than the number of the original frames. That is, the image signal recording/reproducing device 4 adds images to the parallax image string having a smaller number of image frames to equate the number of the images making up the parallax image string for the background to that of the images making up the parallax image string for the human.

It is however possible for the image signal recording/reproducing device 4 to formulate interpolated images from the images making up the parallax image string to add the resulting interpolated images to the original parallax image string, instead of repeatedly outputting image frames to add the output image frames to the parallax image string. That is, new images are generated by interpolation from temporally previous and temporally posterior images of the parallax image string having a smaller number of image frames, these new frames being then added to the parallax image string for bringing the number of the frames of the respective parallax image strings into coincidence with each other. If the interpolated images are added in this manner to the original parallax image string, it is possible to obtain a parallax image string, the images of which are smoothly changed with movement of the viewing point positions, even if the number of the image frames making up the parallax image string is increased.

In the above-described embodiment, the parallax image strings are synthesized by chroma key synthesis which synthesizes the images based on the color hue. It is however possible to synthesize the parallax image strings by a technique other than the chroma key synthesis. For example, the parallax image strings may be synthesized based on luminance.

In the above-described embodiment, the parallax image string for the background is prepared from the outset. This parallax image string may, of course, be photographed by the image pickup device 2. The parallax image string for the background may also be formulated by computer graphics.

In the above-described image processing device 1, the parallax image string is generated by imaging the object as the image pickup device 2 is moved at a pre-set speed. Among the methods for photographing the parallax image string, there are a panning system, a rotating system and a re-centering system.

Figure 4:
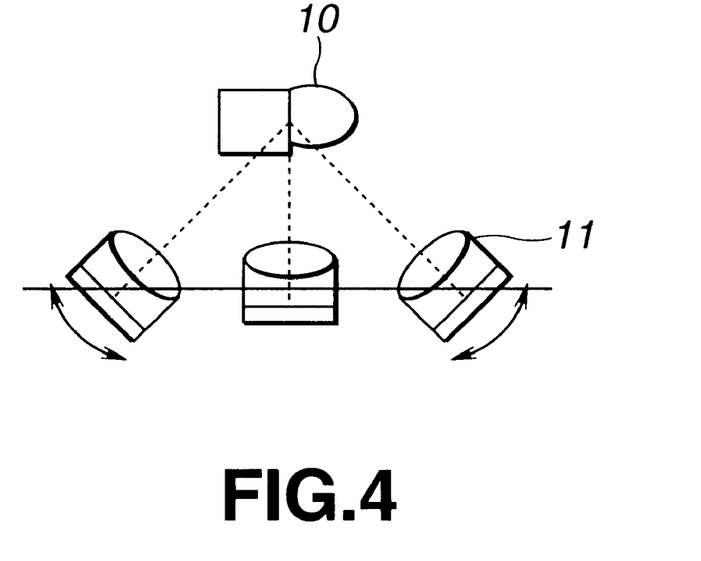
FIG. 4 illustrates a parallax image string photographing method in accordance with the panning system.

In the panning system, the camera 11 is translated along a straight rail, as the direction of the camera 11 is changed so that the camera is perpetually directed to the center of the object 10, and the object 10 is imaged from different positions, as shown in FIG. 4. That is, when imaging a parallax image string by the panning system, the camera 11 directed to the object 10 is translated, as the camera is panned towards the center of the object 10, in order to image the object a large number of times during this camera movement.

Figure 5:
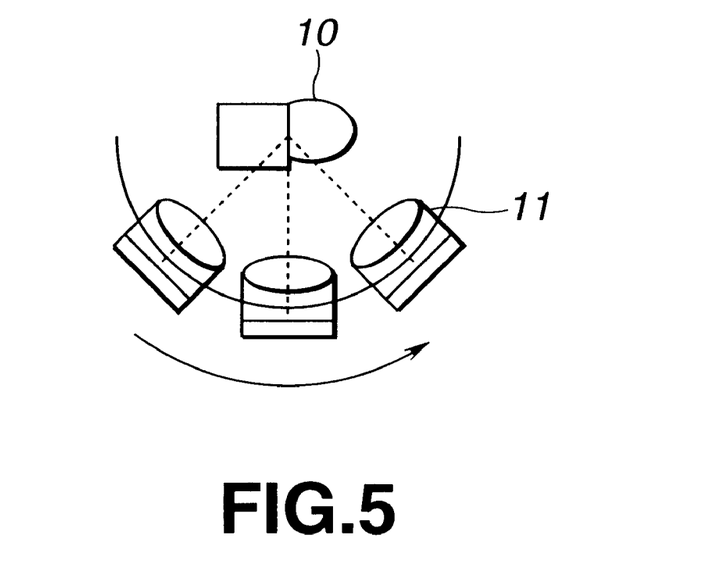
FIG. 5 illustrates a parallax image string photographing method in accordance with the rotating system.

In the rotating system, the camera 11 directed to the center of the object 10 is moved along an arcuate path to photograph a parallax image string. In the rotating system, since the camera 11 is directed at all times to the center of the object 10, the image can be improved in effective resolution, as shown in the FIG. 5.

Figure 6:
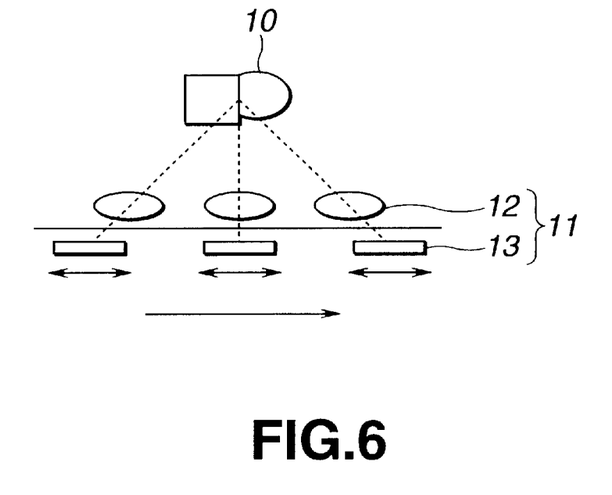
FIG. 6 illustrates a parallax image string photographing method in accordance with the re-centering system.

In the recentering system, seen in FIG. 6, the camera 11 is translated along a straight rail to image the object 10 a large number of times from different positions and, during the imaging operation, a lens 12 of the camera 10 is moved in agreement with the photographing position so that the image of the object 10 will be perpetually located at the center of an imaging plane. That is, in the re-centering system, an image of the object 10 is projected at all times on the center of an imaging plane 13, by varying the relative position between the lens 12 and the imaging plane 13 of the camera 11 in agreement with the movement of a main body unit of the camera.

Any of these systems may be used in photographing the parallax image string by the image processing device 1 embodying the present invention.

Meanwhile, the image signals of the parallax image string newly generated by the image processing device 1 are routed to, for example, a holographic stereogram generating system for use in generating the holographic stereogram. The holographic stereogram generating system is hereinafter explained with reference to a specified example.

Meanwhile, the holographic stereogram generating system, now explained, directly outputs a film-shaped recording medium for hologram, having interference fringes of the object light and the reference light, recorded thereon, as a holographic stereogram. The holographic stereogram, having the interference fringes of the object light and the reference light directly recorded thereon, is generally termed a one-step holographic stereogram.

Figure 7:
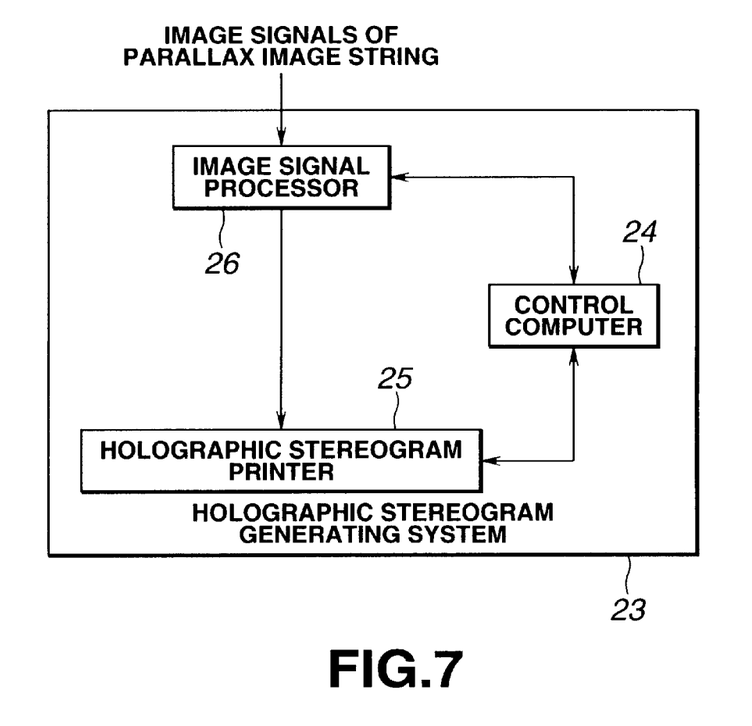
FIG. 7 is a block diagram showing an illustrative structure of a holographic stereogram preparing system.

FIG. 7 shows an illustrative structure of a holographic stereogram generating system 23, configured for generating a one-step holographic stereogram.

The holographic stereogram generating system 23 includes a control computer 24, responsible for overall control of the holographic stereogram generating system, a holographic stereogram printer 25 having an optical system for generating a holographic stereogram and an image signal furnishing device 26 for supplying image signals for an image for light exposure to the holographic stereogram printer 25 in the course of generation of a holographic stereogram.

An image signal processing device 26 receives image signals of a parallax image string from the image processing device 1 and, if necessary, performs viewing point conversion processing or keystone distortion correction processing on the parallax image string to send the resulting image signals to the holographic stereogram printer on the frame basis. Each time the image signal processing device 26 sends one-frame image signals to the holographic stereogram printer 25, the image signal processing device 26 issues a timing signal indicating that effect to the control computer 24.

The control computer 24 drives the holographic stereogram printer 25 based on the timing signals from the image signal processing device 26. Under control by the control computer 24, the holographic stereogram printer 25 sequentially records images corresponding to image signals supplied from the image signal processing device 26 to a recording medium for hologram, set in the holographic stereogram printer 25, as strip-shaped elementary holograms.

At this time, the control computer 24 controls a light exposure shutter and a recording medium feed mechanism, and so forth provided in the holographic stereogram printer 25. Specifically, the control computer 24 sends out a control signal to the holographic stereogram printer 25 to control the opening/closure of the shutter for light exposure or the feed movement of the recording medium for hologram by the recording medium feed mechanism.

Figure 8A:
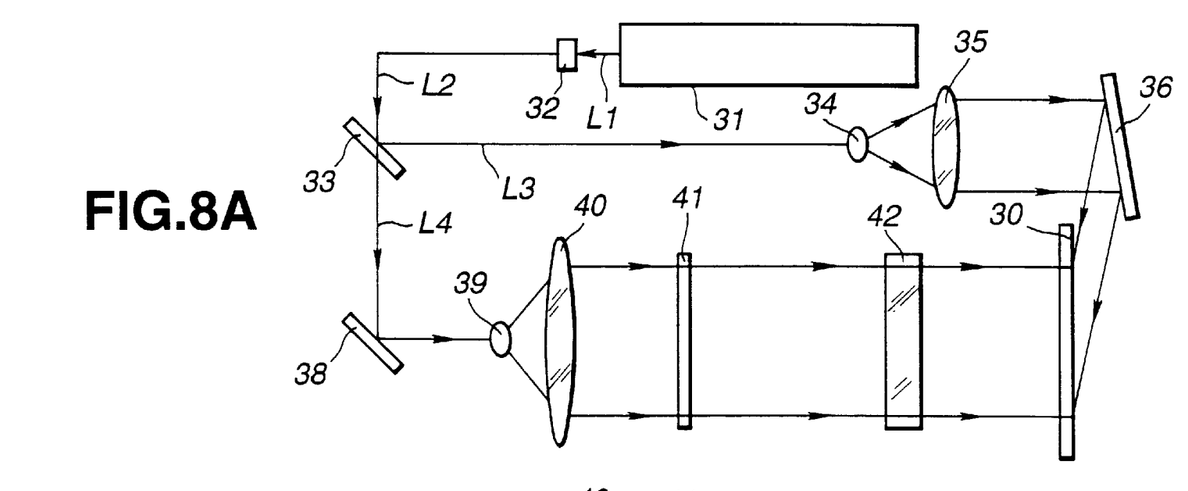
Figure 8B:
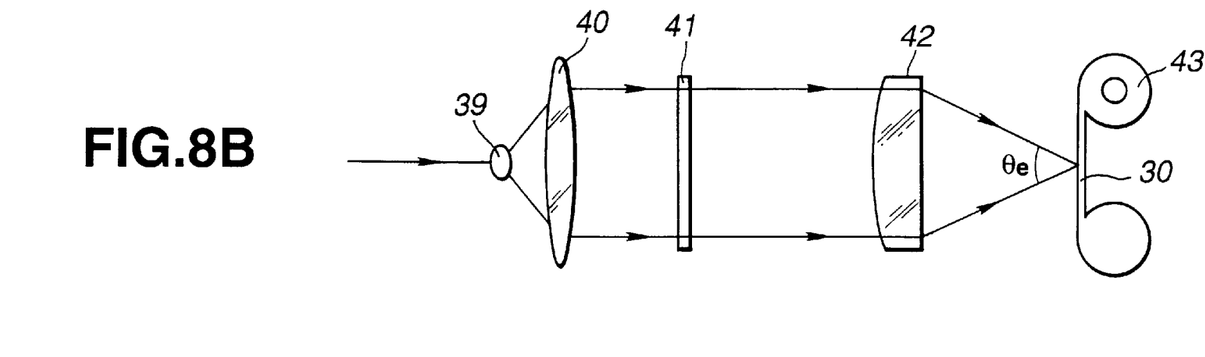

Referring to FIG. 8, the holographic stereogram printer 25 is explained in detail. Specifically, FIGS. 8A and 8B are a top plan view of the optical system of the holographic stereogram printer 25 and a side view of the object light related portion of the optical system of the holographic stereogram printer 25, respectively.

Referring to FIG. 8A, the holographic stereogram printer 25 includes a laser light source 31, for radiating the laser light of a pre-set wavelength, and a light exposure shutter 32 and a half mirror 33, arranged on the optical axis of the laser light L1 from the laser light source 31.

The light exposure shutter 32 is controlled by the control computer 24 so that it is closed and opened when the recording medium for hologram 30 is not exposed to light or otherwise, respectively. The half mirror 33 is used for separating the laser light L2 transmitted through the recording medium for hologram 32. The light L3 reflected by the half mirror 33 becomes the reference light, with the light L4 transmitted through the half mirror 33 becoming the object light.

On the optical axis of the light L3, reflected by the half-mirror 33, there are arranged, as an optical system for reference light, a cylindrical lens 34, a collimator lens 35, for collimating the reference light, and a total reflection mirror 36, for reflecting the light collimated by the collimator lens 35.

The light reflected by the half-mirror 33 is first turned into divergent light by the cylindrical lens 34 and then is collimated by the collimator lens 35. The collimated light is reflected by the total reflection mirror 36 to fall on the recording medium for hologram 30.

On the optical axis of the light L4, transmitted through the half-mirror 33, there are arranged, as an optical system for the object light, a total reflection mirror 38, for reflecting the light transmitted through the half-mirror 33, a spatial filter 39, combined from a convex lens and a pin-hole, a collimator lens 40 for collimating the object light, a display device 41, for displaying an image of an object for recording, and a cylindrical lens 42 for condensing the object light on the recording medium for hologram 30, in this order, as shown in FIGS. 8A and 8B.

The light L4, transmitted through the half-mirror 33, is reflected by the total reflection mirror 38 and turned by the spatial filter 39 into diffused light from a point light source. The diffused light then is collimated by the collimator lens 40 to fall on the display device 41. The display device 41 is a transmission type image display device, comprised of, for example, a liquid crystal panel, and displays an image corresponding to image data furnished from the image data furnishing device 26. The light transmitted through the display device 41 is modulated in accordance with an image displayed on the display device 41 to fall on the cylindrical lens 42.

The light transmitted through the display device 41 is converged by the cylindrical lens 42 in the transverse direction at a pre-set light collecting angle $\theta_e$. This converged light falls as the object light on the recording medium for hologram 30. That is, in this holographic stereogram printer 25, the projected light from the display device 41 falls on the recording medium for hologram 30 as the strip-shaped object light.

It is noted that the reference light and the object light are caused to fall on one and the other surfaces of the recording medium for hologram 30, respectively. That is, the reference light is caused to fall on one of the surfaces of the recording medium for hologram 30 at a pre-set angle of incidence, while the object light is caused to fall on the other surface of the recording medium for hologram 30 substantially at a right angle. This causes the reference light and the object light to interfere with each other on the recording medium for hologram 30. The resulting interference fringes are recorded as changes in the refractive index on the recording medium for hologram 30.

The holographic stereogram printer 25 also includes a recording medium feed unit 43 for intermittently feeding the recording medium for hologram 30 under control by the control computer 24. Each time an image corresponding to the image data supplied from the image data furnishing device 26 is recorded as one elementary hologram on the recording medium for hologram 30, loaded in a pre-set state on the recording medium feed unit 43, the recording medium feed unit 43 intermittently feeds the recording medium for hologram 30 in an amount corresponding to an elementary hologram, based on the control signal from the image signal processing device 26. In this manner, images derived from the image data furnished from the image data furnishing device 26 are sequentially recorded on the recording medium for hologram 30 so as to be contiguous in the transverse direction.

In the holographic stereogram printer 25, the optical path length of the reference light falling on the recording medium for hologram 30 after reflection by the half-mirror 33 is preferably of a substantially equal length to the optical path length of the object light which is transmitted through the half-mirror 33 so as to be incident on the recording medium for the hologram 30 via the display device 41. This increases the interference between the reference light and the object light to improve the image quality of the holographic stereogram.

For improving the image quality of the holographic stereogram, obtained by the holographic stereogram printer 25, a diffusion plate may be provided on the optical path of the object light. By arranging the diffusion plate on the optical path of the object light, noise components in the object light become diffused, while the light intensity distribution of the object light incident on the recording medium for hologram 30 becomes more uniform to improve the image quality of the generated holographic stereogram.

If the diffusion plate is provided in this manner, it is preferred to arrange a mask having a strip-shaped opening registering with the shape of the elementary hologram between the diffusion plate and the recording medium for hologram 30. By arranging the mask in this manner, redundant portions of the object light, diffused by the diffusion plate, are shielded by the mask, thus further improving the image quality of the produced holographic stereogram.

For affording a viewing angle in the longitudinal direction to the holographic stereogram, a one-dimensional diffusion plate may be provided on the optical path of the object light for diffusing the object light in the holographic stereogram printer 25. With the one-dimensional diffusion plate, provided on the optical path of the object light, the object light is diffused in the longitudinal direction, that is along the long-axis direction of the elementary hologram, so that the produced holographic stereogram has a viewing angle in the longitudinal direction.

If such one-dimensional diffusion plate is provided in this manner, a louver film having a fine screen-shaped lattice is preferably provided between the holographic stereogram 30 and the one-dimensional diffusion plate. By arranging the louver film in this manner, it is possible to prevent the reference light transmitted through the recording medium for hologram 30 from being reflected by the one-dimensional diffusion plate to fall again on the recording medium for hologram 30.

The holographic stereogram generating unit 23 operates as follows:

When preparing the holographic stereogram, the image data furnishing device 26 sends out image data to the display device 41 of the holographic stereogram printer 25 to cause an image for light exposure corresponding to the image data to be displayed on the display device 41. At this time, the image data furnishing device 26 sends out to the control computer 24 a timing signal indicating the effect of sending out the image data to the display device 41 of the holographic stereogram printer 25.

On reception of the timing signal, the control computer 24 sends out a control signal to the light-exposure shutter 32 to open the light-exposure shutter 32 for a preset time. This exposes the recording medium for hologram 30 to light.

Of the laser light L2, radiated by the laser light source 31 and transmitted through the light-exposure shutter 32, the light L3, reflected by the half-mirror 33, falls on the recording medium for hologram 30 as the reference light. The light L4, transmitted through the half-mirror 33, becomes the projected light, projecting the image displayed on the display device 41. This projected light falls on the recording medium for hologram 30 as the object light. This records the image for light exposure, displayed on the display device 41, on the recording medium for hologram 30 as the strip-shaped elementary holograms.

When the recording of an image on the recording medium for hologram 30 comes to a close, the control computer 24 causes a control signal to be sent to the recording medium feed unit 43 to feed the recording medium for hologram 30 by one elementary hologram.

The above-described operation is repeated as the images for exposure displayed on the display device 41 are changed over in the sequence of the parallax image string. This sequentially records the images for light exposure, corresponding to the image data supplied from the image data furnishing device 26, on the recording medium for hologram 30, as strip-shaped elementary holograms.

Meanwhile, there are occasions wherein, in sequentially recording the elementary holograms as described above, the recording medium for the hologram 30 is subjected to slight vibrations. In such case, subsidence of the vibrations is awaited each time the recording medium for the hologram 30 is fed, and the elementary holograms are recorded after the subsidence of the vibrations.

Thus, in the present holographic stereogram generating unit 23, image signals are sequentially supplied from the image data furnishing device 26 to the holographic stereogram printer 25, the images for exposure corresponding to the image signals are sequentially displayed on the display device 41, the light-exposure shutter 32 is opened for each image and the respective images are sequentially recorded on the recording medium for the hologram 30 as the strip-shaped elementary holograms. Since the elementary holograms are fed one elementary hologram for each image, the elementary holograms are arrayed in succession on the recording medium for hologram 30 in the transverse direction. This records the parallax image string, composed of plural images having the parallax information in the transverse direction, as plural elementary holograms consecutive to one another in the transverse direction, on the recording medium for hologram 30, thus yielding a holographic stereogram having the parallax in the transverse direction.

With the above-described holographic stereogram generating system, the image data generating device 1 and the holographic stereogram generating device 23 are independent of each other. These, however, may be united together. In this case, the control computer 7 of the image processing device 1 may be used simultaneously as the control computer 24 of the holographic stereogram generating system 23, or the chroma key synthesis device 6 of the image processing device 1 may be combined with the image signal processing device 26 of the holographic stereogram generating system 23 as a sole image processing device.

What is claimed is:

1. An image processing apparatus for generating a parallax image string composed of a plurality of images carrying the parallax information, comprising:

image frame number adjustment means for equating the numbers of image frames making up each of a plurality of parallax image strings to one another; and image synthesis means for synthesizing the parallax image strings, the numbers of the image frames of which have been equated to one another by the image frame number adjustment means, to generate a new parallax image string, wherein said generated another parallax image string is used for forming a single hologram, and said plurality of parallax image strings respectively corresponds to different images to be positioned different locations in a depth direction with respect to a display surface of said single hologram, wherein, when adding images to a parallax image string having a smaller number of image frames, said image frame number adjustment means generates interpolated images from the images making up the parallax image string to add the resulting interpolated images to an original parallax image string.

2. The image processing apparatus according to claim 1 wherein said image frame number adjustment means equates the numbers of image frames making up each of a plurality of parallax image strings to one another by adding images to a parallax image string having a smaller number of image frames.

3. The image processing apparatus according to claim 1 wherein said image synthesis means synthesizes the parallax image strings, the number of image frames of which has been equated by said image frame number adjustment means, by chroma key synthesis, to generate a new parallax image string.

4. An image processing method for generating a parallax image string composed of a plurality of images carrying the parallax information, comprising:

receiving a plurality of parallax image strings respectively corresponds to different images to be positioned different locations in a depth direction with respect to a display surface of said single hologram, equating the numbers of image frames making up each of said plurality of parallax image strings to one another; and synthesizing the parallax image strings, the numbers of the image frames of which have been equated to one another, to generate another parallax image string, wherein, when adding images to a parallax image string having a smaller number of images, interpolated images are generated from the images making up the parallax image string and added to the parallax image string having a smaller number of images.

5. The image processing method according to claim 4 wherein, when equating the numbers of images making up a plurality of parallax image strings, images are added to a parallax image string having a smaller number of images.

6. The image processing method according to claim 4 wherein the parallax image strings having the number of images equated are synthesized by chroma key synthesis.

7. An image processing apparatus for generating a parallax image string composed of a plurality of images carrying the parallax information, comprising:

image frame number adjustment means for equating the numbers of image frames making up each of a plurality of parallax image strings to one another; and image synthesis means for synthesizing the parallax image strings, the numbers of the image frames of which have been equated to one another by the image frame number adjustment means, to generate a new parallax image string, wherein said generated another parallax image string is used for forming a single hologram, and said plurality of parallax image strings respectively corresponds to different images to be positioned different locations in a depth direction with respect to a display surface of said single hologram, wherein in said plurality of parallax image strings, the number of image frames included in a first parallax image string is less than that of a second parallax image strings if an image corresponding to said first parallax image string is to be positioned at a depth that is less than that of an image corresponding to said second parallax image string, said depth being a distance in a normal direction to said display surface of said single hologram.

8. The image processing apparatus according to claim 7 wherein said image frame number adjustment means equates the numbers of image frames making up each of a plurality of parallax image strings to one another by adding images to a parallax image string having a smaller number of image frames.

9. The image processing apparatus according to claim 8 wherein, when adding images to a parallax image string having a smaller number of image frames, said image frame number adjustment means generates interpolated images from the images making up the parallax image string to add the resulting interpolated images to an original parallax image string.

10. The image processing apparatus according to claim 7 wherein said image synthesis means synthesizes the parallax image strings, the number of image frames of which has been equated by said image frame number adjustment means, by chroma key synthesis, to generate a new parallax image string.

* * * * *

UNITED STATES PATENT AND TRADEMARK OFFICE
CERTIFICATE OF CORRECTION

PATENT NO. : 6,614,467 B1 Page 1 of 1
DATED : September 2, 2003
INVENTOR(S) : Shigeyuki Baba et al.

It is certified that error appears in the above-identified patent and that said Letters Patent is hereby corrected as shown below:

Column 13,
Line 14, replace "corresponds to different images to be positioned different" with -- corresponding to different images to be positioned at different --.

Column 14,
Line 9, replace "corresponds to" with -- corresponding to --
Line 10, replace "different locations" with -- at different locations --.
Line 15, replace "image strings" with -- image string --.

Signed and Sealed this

Twenty-fourth Day of February, 2004

JON W. DUDAS
*Acting Director of the United States Patent and Trademark Office*